Oct. 3, 1933. F. C. ZEISBERG 1,928,749
NITRIC ACID CONCENTRATION
Filed Dec. 6, 1930
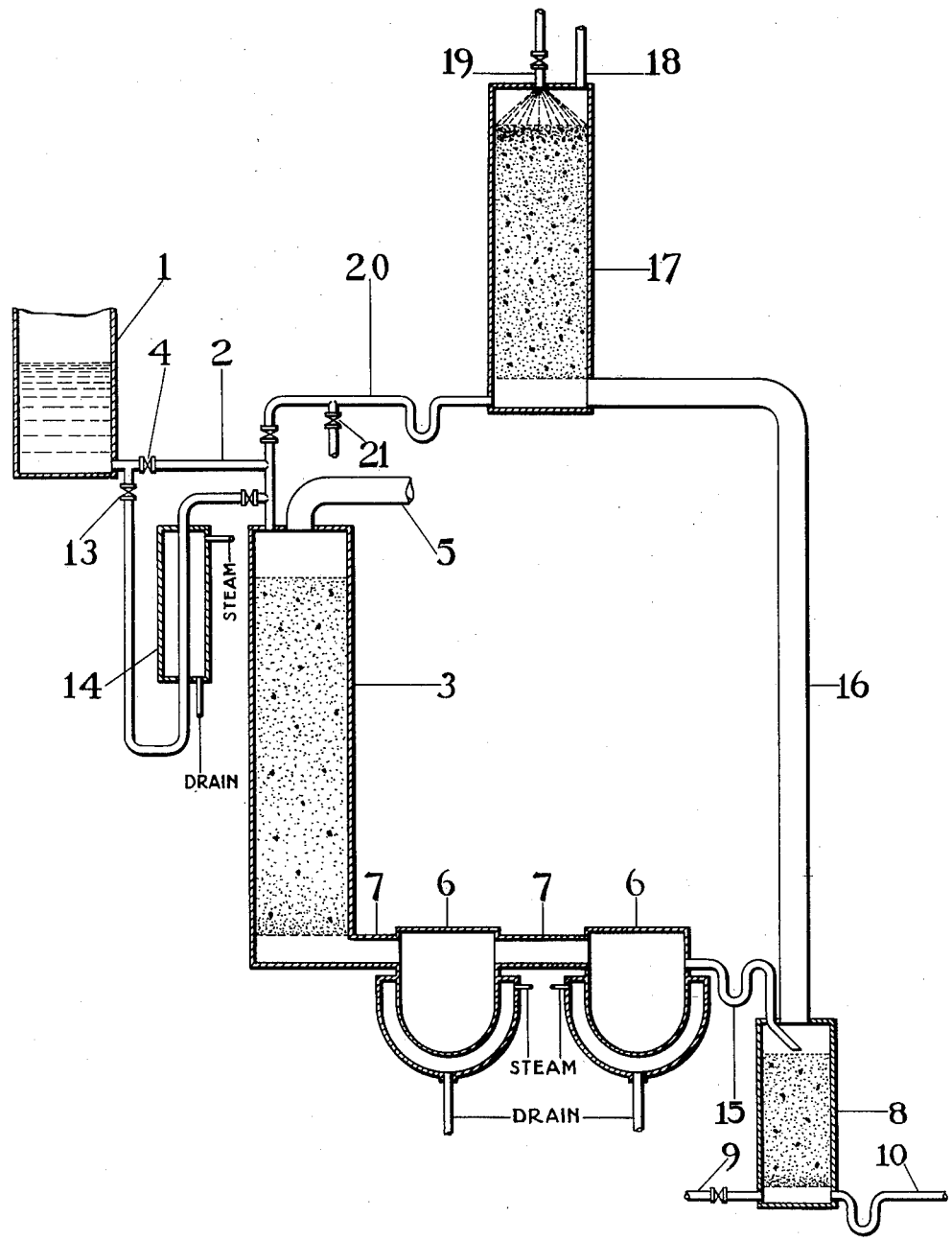
Fred C. Zeisberg Inventor
By his Attorney Patented Oct. 3, 1933

1,928,749

UNITED STATES PATENT OFFICE 1,928,749

NITRIC ACID CONCENTRATION

Fred C. Zeisberg, Wilmington, Del., assignor to E. I. du Pont de Nemours & Company, Wilmington, Del., a corporation of Delaware Application December 6, 1930. Serial No. 500,483

8 Claims. (Cl. 23—160)

This invention relates to the concentration of nitric acid, and more particularly to an improvement in the process disclosed in the copending application of S. L. Handforth, Serial Number 429,308, filed February 18, 1930.

According to the process disclosed in the foregoing copending application, a mixture of weak nitric acid and a dehydrating agent is continuously fed into the top of an acid proof fractionating column, and vapors of highly concentrated nitric acid which are bleached are withdrawn from this column, condensed and absorbed in the usual manner. The dehydrating column discharges from the bottom a boiling mixture of sulfuric acid, nitric acid and water, which mixture flows to a series of boiling vessels, where, by the application of external heat, it is concentrated, the vapors of nitric acid and water produced in this concentration passing into the base of the dehydrating column, where, by their condensation they evolve a portion of the heat required to drive off the vapors of highly concentrated nitric acid at the top of the dehydrating column. The boiling concentrate from the boiling vessels, still containing small amounts of nitric acid, passes finally to a second fractionating column, more specially referred to as the "denitrating column", where it is denitrated by coming into contact with a counter-current of steam which is introduced as live steam into the bottom of the denitrating column. The liquid discharged from the base of the denitrating column is dilute sulfuric acid free from nitric acid, containing the water originally in the dilute nitric acid to be concentrated and the water introduced as steam into the base of the denitrating column. The vapors discharged from the top of the denitrating column, consisting of water and nitric acid but containing very little nitric acid, pass into the base of the dehydrating column, either directly or by way of the boiling vessels, and supply, by their condensation in the dehydrating column, the remainder of the heat necessary to vaporize the nitric acid evolved from the top of the dehydrating column as vapors of highly concentrated nitric acid.

While the process described in the foregoing accomplishes the continuous concentration of nitric acid with the use of much less sulfuric acid than processes hitherto known or described, with other accompanying advances, I have now devised a process whereby still less dehydrating agent is required by eliminating the diluting effect of the live steam added at the base of the denitrating column, which all condenses in the said system with the resulting effect of diluting the effluent liquid.

A principal object of my invention is, therefore, to overcome this diluting effect. Another object is to improve generally upon the process of concentrating nitric acid. Other objects will appears as the description proceeds.

These objects are accomplished according to one embodiment of my invention by employing apparatus of the type described in copending application 429,308, as shown in the accompanying drawing, but supplementing this apparatus with a dephlegmating column, together with means for removing from or utilizing the recovered nitric acid in the system, and also removing water vapors. I also propose to provide the boiling vessels 6 with greater heat transfer capacity than has been the practice in the process of said copending application, either by using a greater multiplicity of them, or by increasing the heat transfer surface of those proposed in said copending application, one of the advantages being that these boiling vessels may supply all of the vapor required in the dehydrating column.

The liquid from the boiling vessels flows through the trapped line 15 into the denitrating column 8, and is there denitrated with live steam introduced through the line 9. The denitrated weak sulfuric acid, or other dehydrating agent, leaves the system through the trapped line 10.

The vapors from the denitrating column, consisting largely of steam, but containing some nitric acid, instead of passing to the dehydrating column through the line 7, pass through the line 16, to a dephlegmating column 17, which may be either a plate column, or a packed column of acid proof construction. The top of the dephlegmating column is supplied with a carefully regulated amount of cold water through the line 19, but other means of providing this cooling may be used. This water supply is so regulated that substantially all of the nitric acid in the vapors from the denitrating column is condensed, but a large amount of the water in vapor form remains uncondensed and escapes to the atmosphere through the vent 18.

The condensed nitric acid, of a liquid concentration essentially in equilibrium with the incoming vapors from the denitrating column, flows out of the dephlegmating column through the trapped line 20, and may be return to the dehydrating column 3, for reconcentration, or may be separately drawn off through a valve 21, should there be other use for acid of this relatively low concentration.

It will thus be apparent from the foregoing description of my invention that to the extent water vapor leaves the system through vent 18, dilution of the acid system is avoided. Since the operation of the system can be adjusted to deliver a spent dehydrating agent of the same concentration as before, a reduction of sulfuric ratio is thereby brought about, because the diluting effect of the condensed live steam, according to the process disclosed in said copending application of S. L. Handforth, is absent.

The following illustrative example of one embodiment of my invention is given, but it is to be understood that this is not to be taken as in any way limiting the scope of the invention.

A mixture containing 31.1% HNO₃, 44.5% H₂SO₄, and 24.4% H₂O, by weight, is introduced into the container 1. The rate of flow therefrom is controlled by valves 4 or 13. The resulting vapors of strong nitric acid evolved from tower 3 pass out through conduit 5 to a suitable bleaching and condensing equipment according to well known practice. The liquid leaving the bottom of tower 3, and still containing appreciable amounts of nitric acid (for example 2.6% HNO₃ and 55.3% H₂SO₄), enters the externally heated boiling vessels 6 through conduit 7. Nitric acid and water vapors are evolved in these vessels 6, through absorption of heat supplied by steam in the jackets of the vessels, and pass back into the tower through conduit 7. The partially concentrated residual acid, still containing some nitric acid (for example, 0.2% HNO₃ and 66.0% H₂SO₄), leaves the boiling vessels and enters the denitrating column 8, through the trap 15. Steam enters the bottom of the tower through pipe 9 and flows upward through the tower counter-current to the liquid and drives the remaining traces of nitric acid from the liquid. The denitrated residual acid (66.0% H₂SO₄ and 34.0% H₂O) leaves the system through the trap 10.

The vapors evolved in tower 8 pass to the bottom of the dephlegmating column 17 through the conduit 16. These vapors consist largely of water (for example, 95.8% H₂O, and 4.2% HNO₃), and in passing upwardly through the tower 17 are met by a carefully regulated counter-current of cold water introduced through the valved inlet 19, resulting in causing the nitric acid to condense to a liquid (containing, for example, 28% HNO₃) which flows from the tower through the trapped line 20 and returns to the denitrating column 3. The remainder of the water vapor, now substantially free from nitric acid, escapes to the atmosphere through conduit 18.

In the foregoing illustrative example, by which the weak nitric acid produced in the dephlegmating column is used up in the process itself, the sulfuric ratio (pounds of 100% H₂SO₄ used per pounds of 100% HNO₃ obtained in concentrated distillate) is 1.43. This compares with a sulfuric ratio of 1.57 required by the process as disclosed in said copending application of S. L. Handforth when both processes start with 60% nitric acid and 93% sulfuric acid. If, on the other hand, the weak nitric acid produced in the dephlegmating column is withdrawn from the system for other uses (for example, through valve 21), then the sulfuric ratio would be further slightly reduced to 1.42, and approximately 0.5% of the nitric acid produced would be at a low strength, the remaining 99.5% being highly concentrated nitric.

As many apparently widely different embodiments of this invention may be made without departing from the spirit and scope thereof, it is to be understood that I do not limit myself to the foregoing examples or descriptions except as indicated in the following patent claims:

I claim:

1. The process which comprises passing a mixture of nitric acid and a dehydrating agent down a fractionating tower counter-current to nitric acid and water vapors arising from partially concentrating, by external heating means, the resulting liquid still containing nitric acid, and thus separating the mixture of nitric acid and dehydrating agent into vapors of highly concentrated nitric acid and the said resulting liquid, and then further passing this said resulting liquid, partially concentrated, counter-current to water vapors in a second fractionating column, conveying the vapors from the second fractionating column or denitrating column to a dephlegmating column, and in it separating these vapors into residual nitric acid substantially in equilibrium with the incoming vapors, and steam, and removing the steam.

2. The process of claim 1 in which the nitric acid separated in the dephlegmating column is returned to the first fractionating column.

3. The process of claim 1 in which substantially all of the nitric acid in the vapors from the denitrating column are condensed in the dephlegmating column and the water vapors are removed from the system.

4. The process of claim 1 in which the residual nitric acid separated from the vapors in the dephlegmating column is removed from the system.

5. The process of concentrating nitric acid which comprises passing a mixture of weak nitric acid and a dehydrating agent into a fractionating tower counter-current to nitric acid and water vapors, driving off therefrom nitric acid vapors, passing the residual mixture from said fractionating tower still containing some nitric acid into at least one boiling vessel externally heated to drive off further nitric acid and to concentrate the dehydrating agent, passing the vapors arising in the boiling vessel into the fractionating tower, passing the mixture from said externally heated boiling vessel into a second fractionating tower, driving off the remaining nitric acid by introducing steam into the bottom of the second fractionating tower and conveying the vapors arising from the second fractionating tower into the bottom of a dephlegmating tower and separating these vapors into a residual nitric acid substantially in equilibrium with the incoming vapors.

6. The process of claim 5 in which substantially all of the nitric acid in the vapors from the denitrating column are condensed in the dephlegmating column and the water vapors are removed from the system.

7. The process of claim 5 in which the residual nitric acid separating from the vapors in the dephlegmating column is removed from the system.

8. The process of concentrating nitric acid which comprises passing a mixture of weak nitric acid and a dehydrating agent into a fractionating tower counter-current to nitric acid and water vapors, driving off therefrom nitric acid vapors, passing the residual mixture from said fractionating tower still containing a portion of the original nitric acid, into a series of externally heated boiling vessels to drive off further nitric acid and to concentrate the dehydrating agent, passing the vapors arising in the boiling vessels into the fractionating tower, passing the mixture from said externally heated boiling vessels into a second fractionating tower, driving off the remaining nitric acid by introducing steam into the bottom of said second tower and conveying the vapors arising from the second fractionating tower to a dephlegmating column, separating the nitric acid therefrom and removing the water vapors from the system.

FRED C. ZEISBERG.